Nov. 27, 1923.　　　　　O. SHAFFER　　　　　1,475,516
TRANSMISSION MECHANISM
Filed Oct. 4, 1920　　　2 Sheets-Sheet 1
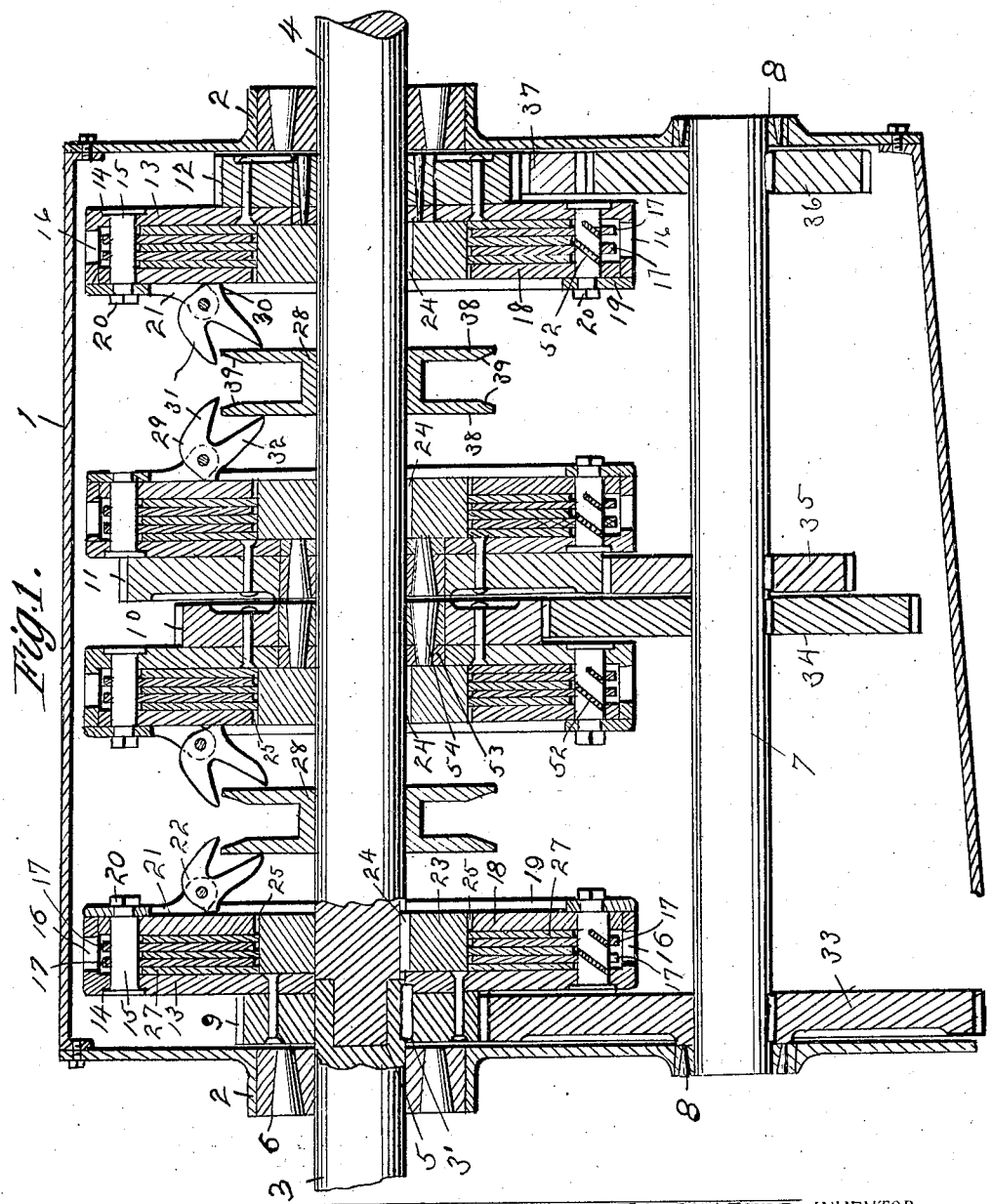
WITNESSES
Guy M Spring
Frank W. O'Connell
OTTO SHAFFER INVENTOR
BY
Richard B. Owen
ATTORNEY.

Nov. 27, 1923.  1,475,516
O. SHAFFER
TRANSMISSION MECHANISM
Filed Oct. 4, 1920  2 Sheets-Sheet 2
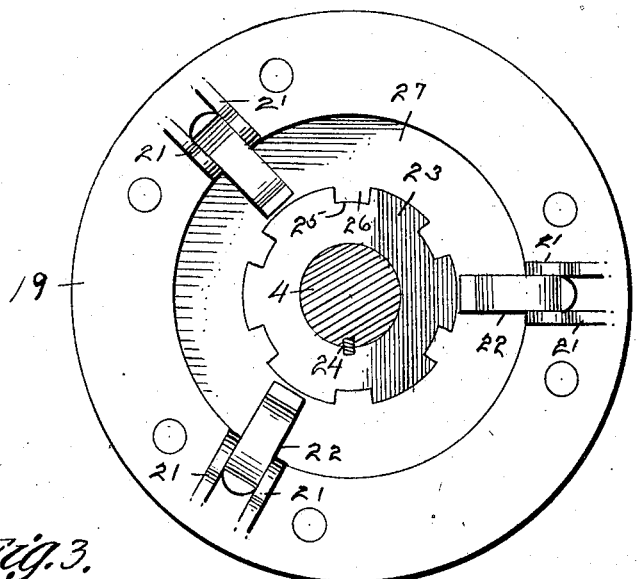
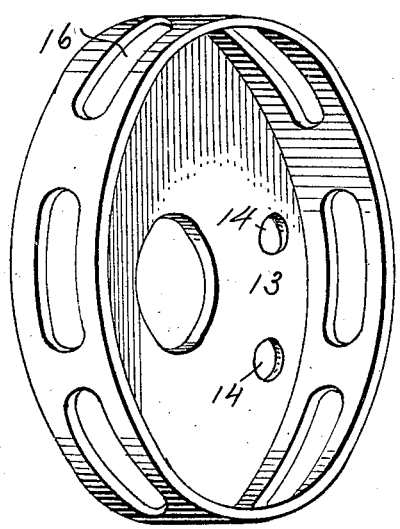
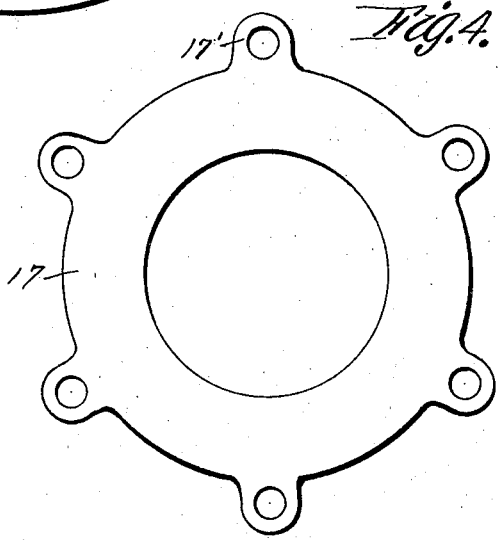
WITNESSES  OTTO SHAFFER INVENTOR.
BY
ATTORNEY.

Patented Nov. 27, 1923.

1,475,516

UNITED STATES PATENT OFFICE.

OTTO SHAFFER, OF PORTERVILLE, CALIFORNIA.

TRANSMISSION MECHANISM.

Application filed October 4, 1920. Serial No. 414,516.

*To all whom it may concern:*

Be it known that I, OTTO SHAFFER, a citizen of the United States, residing at Porterville, in the county of Tulare and State of California, have invented certain new and useful Improvements in Transmission Mechanism, of which the following is a specification.

This invention relates to novel clutch devices for a transmission mechanism whereby a change of speed may be effected through the manipulation of the improved clutch devices, and without shifting gears.

An additional object is to provide in a change speed transmission adapted for automobiles an improved clutch means enabling a change from one speed to another to be effected smoothly and with an absence of the abrupt jar usually accompanying the shifting of gears.

With the above and other objects in view, the invention may be said to reside generally in the details of construction, combination and arrangement of parts as will be hereinafter more fully pointed out and described, reference being had to the accompanying drawings wherein, Figure 1 is a horizontal, transverse, sectional view of the housing, disclosing the relative positions of the driven and counter shafts, Figure 2 is a plan view of one of the clutch elements, Figure 3 is a perspective view of the clutch case, and Figure 4 is a plan view of one of the clutch plates.

The transmission case or housing 1 is provided with shaft bearing seats 2 at each end, through one of which is inserted the end of the engine or driving shaft 3. The engine shaft is joined to the transmission shaft 4 by means of a cylindrical tongue and socket arrangement as indicated at 5, this juncture being such as to permit each shaft to be independently rotated. Roller bearings 6 are provided in the bearing seats 2 and facilitate rotary movement of the shafts. A counter shaft 7 is arranged on one side of transmission shaft 4, running parallel therewith and having its ends journaled, as indicated at 8 in the end walls of the transmission housing. Arranged upon the transmission shaft is a plurality of speed gears varying in diameter and arranged about as illustrated in Figure 1 of the drawing. These gears, indicated at 9, 10, 11 and 12 respectively, are each provided with clutch means whereby the gears may be individually rotated with the transmission shaft for effecting the change of speed desired. Each clutch means includes a circular clutch casing 13 shown in perspective in Figure 3. The casing is provided with an enlarged central opening and is loosely mounted upon the transmission shaft to rotate independently thereof being provided with a circular arrangement of bolt holes 14 through which pass the shanks of securing bolts 15. The rim of the casing is provided with a number of elongated oil slots 16 opening inwardly from the outside edge of the casing.

Arranged within the casing are clutch-disk members 17, and perforated lugs 17' the latter being arranged in spaced relation about the outer edge and apertured to receive the shanks of fastening bolts 15 upon which the clutch disks are slidably mounted. A face plate 18 encloses the disks within the casing, being arranged upon the bolts 15. This plate is adapted for movement under pressure of the clutch cams inwardly of the casing for compressing the friction disks of the device. It is retained within the casing by means of an annular plate 19 resting against the flange of the casing and rigidly held in place by nuts 20 on the ends of the fastening bolts 15. This plate is provided with spaced sets or pairs of lugs 21, each of which carries a pivotally mounted clutch cam 22. The plate 19 and casing 13 together with elements 17 and 18, constitute what may be termed the movable frame of the clutch; the parts thereof being held together by the fastening bolts 15. One of such clutches is designed to be affixed rigidly to each of the speed gears, bolts or other fastening means being suitably employed for this purpose, in order that there may be a clutch device permanently associated with each gear. In the arrangement of the gears, they are so mounted upon the transmission shaft as to have the clutch frames of gears 9 and 12 respectively opposed to the clutch frames of gears 10 and 11 for a purpose to presently appear.

Each clutch mechanism includes a hub 23 which fits into the socket formed by the central openings of the clutch disk members 17 and the plate 18 and rest up against the side wall of the casing 13. The hub is loosely mounted with respect to the clutch frame but keyed to the transmission shaft as indicated at 24, to revolve therewith. The hub is provided upon its periphery with a plurality of transversely extending slots or grooves 25 in which the tongue portions 26 of the hub-carried friction disks 27 are received. The hub disks 27, it will be noted from Figure 1 of the drawing, are arranged in between the clutch frame disks 17, the frictional engagement of the disks, one with the other, when compressed serving to lock the frame to the hub or shaft-carried section, whereby the motion of one is transmitted to the other.

The compression of the friction disks for adherence to each other in thus locking the hub to the frame, is accomplished by means of the clutch cams 22 and thrust means 28. The clutch cams are each formed with a cam shaped head 29 having a projection or nose 30 and short and long arms 31 and 32 angularly disposed with respect to one another. These arms provide the means whereby a member is pivoted for pressing the nose of the cam head against the face plate 18 for sliding the same inwardly and compressing or binding the disks against each other. Keyed to one end of counter shaft 7 is a large gear 33 in mesh with the smaller gear 9 of the shaft. Gear 9 is keyed to the end of the shaft 3, as indicated at $3^1$, and revolves therewith, carrying with it, the frame of the clutch mechanism associated with such gear, the hub and disks 27 however, remaining motionless with shaft 4, as long as the disks of both frame and hub are free to pass each other. The rotation of gear 33, by gear 9, causes the counter shaft 7 and gears 34, 35 and 36 to be also rotated. Counter shaft gear 34 is in continual mesh with gear 10 of the transmission shaft, both of which constitute the intermediate speed gears of the transmission, while counter-shaft gear 35 and transmission shaft gear 11 mesh with each other to provide low speed gears. The reverse includes gears 12, 36 and intermediate gear 37.

As previously stated, gears 9 and 12 have their clutch devices facing inwardly of the transmission case and respectively opposing the clutch mechanisms of gears 10 and 11. By means of this arrangement, it is possible to operate the toggles of opposed clutches through the medium of a single element, such as the thrust collars 28. These collars are slidably mounted upon transmission shaft 4, one between the clutches of gears 9 and 10 and the other between the clutches of gears 11 and 12. The thrust collars are provided with side flanges 38 designed to abut with the longer arms 32 of the cams when slid along shaft 4, the inside of the flanges being beveled as at 39 to accommodate the shorter arm of the cams as the latter are moved downwardly in the pivoting action of the cams through the pressure of the sliding collar, the flange of the latter fitting into the space between the cam arms.

The adjustment of the thrust collars is accomplished by means of any prefered type of shifting device now common in the art.

In the operation of the device, it is to be remembered that the various gears are always in mesh, running in oil which thoroughly lubricates the parts, finding its way in between the friction disks of the clutch mechanism through the oil ports 16 of the clutch casing. When the parts are disposed as illustrated in Figure 1 of the drawing, the device is in neutral, that is the transmission shaft is disconnected with respect to the engine shaft and rotates idly, if at all. The rotation of the engine or driving shaft 3 is however, transmitted to counter shaft 7 through the meshing of gears 9 and 33, the former being keyed to the engine shaft as indicated at $3'$. The transmission or driven shaft 4 remains motionless as both thrust collars 28 are in a neutral position between the cams of the various clutch frames, thus allowing the springs 52 arranged between members 13 and 18 of the clutch frame to expand for moving and retaining plate 18 outwardly to release friction disks 17 and 27. Gears 10, 11 and 12 rotate through their engagement with counter shaft gears 34, 35 and 36, but being loosely mounted upon the transmission shaft, ride idly thereon as long as the friction disks of the clutch mechanism are not frictionally engaged and, therefore, independently movable.

When it is desired to drive the transmission shaft directly from the engine shaft, in order to obtain the highest speed, the thrust collar located between the gears 9 and 10 is moved against the toggles of the clutch mechanism carried by gear 9. The abutment of the collar against the toggle forces the nose portion 30 inwardly against face plate 18, moving the latter inwardly so that the rotating disks 17 frictionally engage and drive the hub disks 27, rotating the hub and consequently shaft 4, to which the hub is keyed.

Upon shifting the thrust collar in the opposite direction, the same is moved to operate the clutch mechanism of the rotating gear 10 clutching the same up with transmission shaft 4 and causing the latter to be rotated at a slower speed than formerly through the meshing engagement of counter shaft gear 33 with gear 9. It is to be noted that in shifting the collar away from gear 9, the clutch mechanism of that gear is automatically released, permitting the transmission shaft to run idle until clutched up with gear 10. In like manner, the other thrust collar may be shifted to operate the clutch of gear 11 for low speed or against gear 12 for effecting a reversal of the parts, this reverse movement being obtained through the intermediacy of the gear 37 arranged between transmission gear 12 and counter shaft gear 36. It will be noted that the change of speed is effected merely through the shifting of the clutch collars which brings the proper gear into operation for rotating the transmission shaft at the desired speed. There is no shifting of the gears as the latter, in the present invention, continually remain in mesh, the transmission gears running idly with respect to the transmission shaft until clutched up therewith through the operation of the clutch mechanism and thrust collars.

While each hub of the clutch mechanism is keyed to the transmission shaft as indicated at 24, the transmission gears are preferably mounted on bearings of concentrically arranged liners or bushings 53 having divergent inner surfaces providing tapering run ways for the reception of cone shaped roller bearings 54. These bearings enable the gears to rotate easily with respect to the shaft and to be readily brought into operation upon the manipulation of the clutch mechanism.

Having thus described the invention what I claim as new and desire to secure by Letters Patent is:—

A clutch for connecting a driving and a driven member including a disk fixed to one of said members, a plate movable toward and from said disk, a hub on the second member, a series of disks keyed to said hub and slidable longitudinally thereof, the last mentioned disks being positioned between the plate and first disk, other disks carried by the first disk and arranged in alternation to the disks of the last mentioned series, a cam carried by the first disk bearing against the plate, whereby to force the plate toward the first disk and thereby clamp the several disks and plate in frictional engagement, a fork formed on said cam, and a shipper ring slidably and rotatably mounted on the second member and having a flange extending between the arms of the fork whereby movement of the shipper ring will actuate said cam.

In testimony whereof I affix my signature in presence of two witnesses.

OTTO SHAFFER.

Witnesses:
EARL MARTIN,
WILLIAM E. BROWN.